Aug. 11, 1942.　　　　C. R. MOON　　　　2,292,960
AUTOMATIC FEEDING AND STACKING MACHINE
Filed Aug. 21, 1941　　　7 Sheets-Sheet 1

INVENTOR.
CHARLES R. MOON.
BY Lockwood, Goldsmith & Galt
ATTORNEYS.

Aug. 11, 1942.  C. R. MOON  2,292,960
AUTOMATIC FEEDING AND STACKING MACHINE
Filed Aug. 21, 1941  7 Sheets-Sheet 2

INVENTOR.
CHARLES R. MOON.
BY Lockwood, Goldsmith & Galt,
ATTORNEYS.

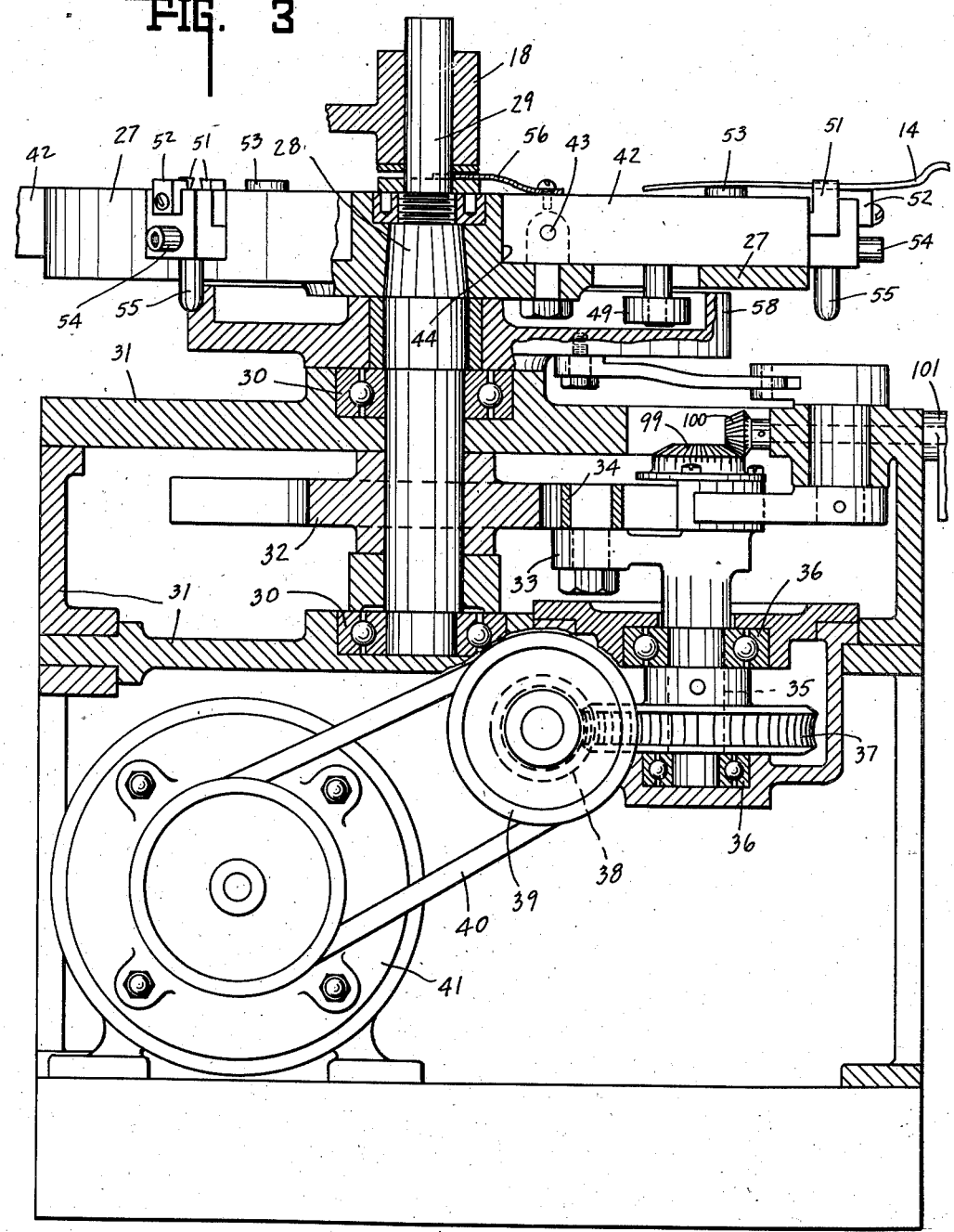

Aug. 11, 1942.　　　　　C. R. MOON　　　　　2,292,960
AUTOMATIC FEEDING AND STACKING MACHINE
Filed Aug. 21, 1941　　　7 Sheets-Sheet 4
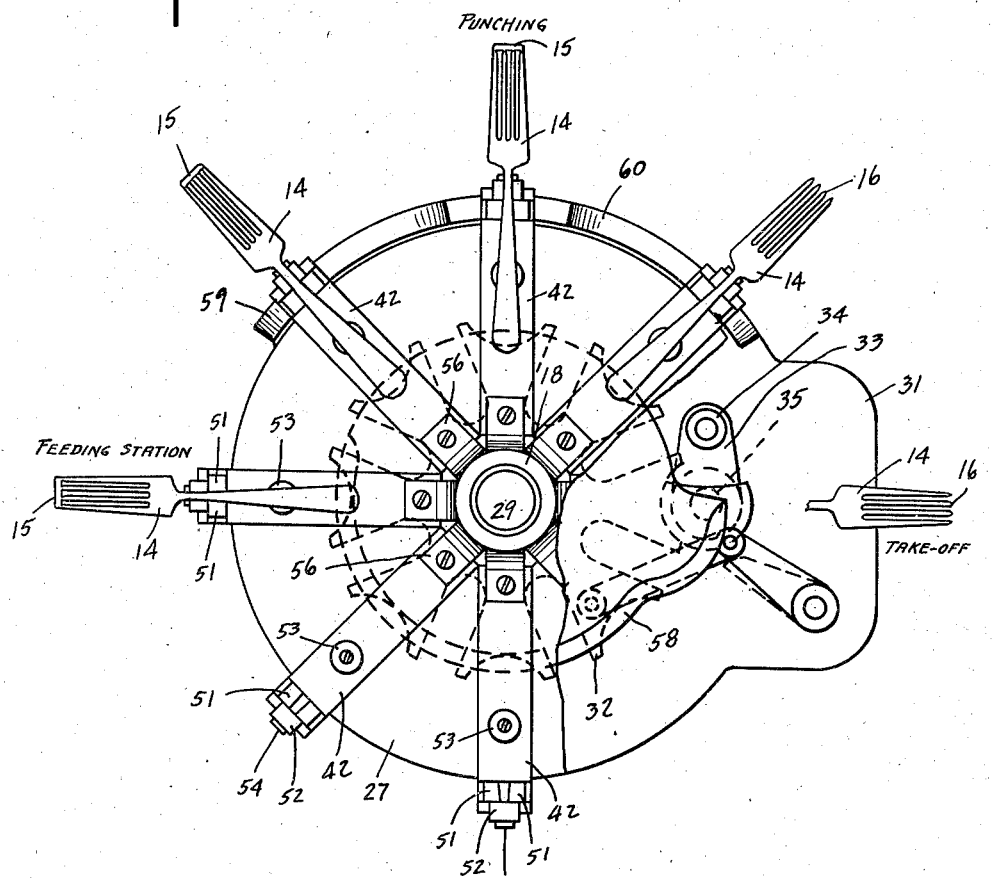
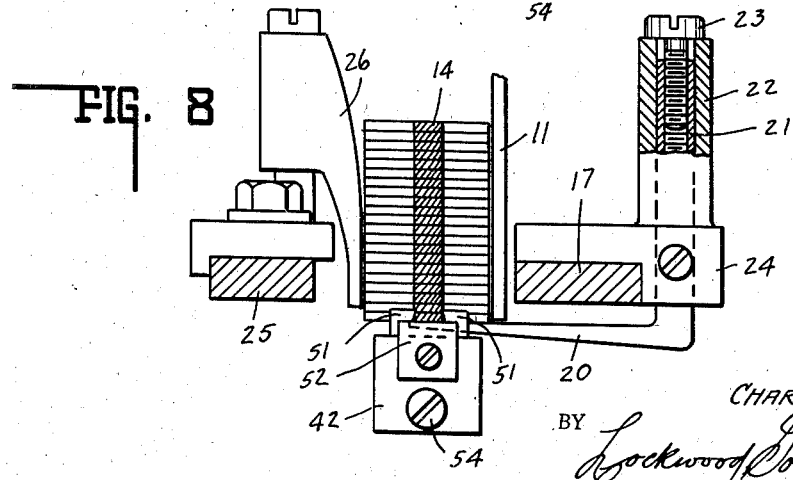
INVENTOR.
CHARLES R. MOON.
BY
Lockwood Goldsmith Galt
ATTORNEYS.

Aug. 11, 1942.  C. R. MOON  2,292,960
AUTOMATIC FEEDING AND STACKING MACHINE
Filed Aug. 21, 1941  7 Sheets-Sheet 5
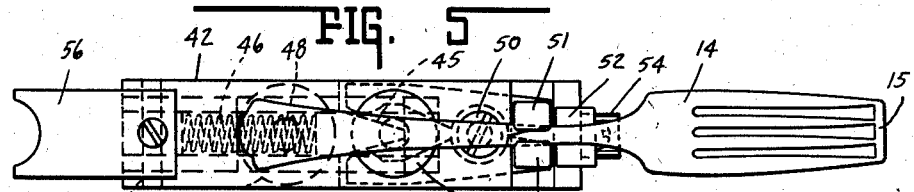
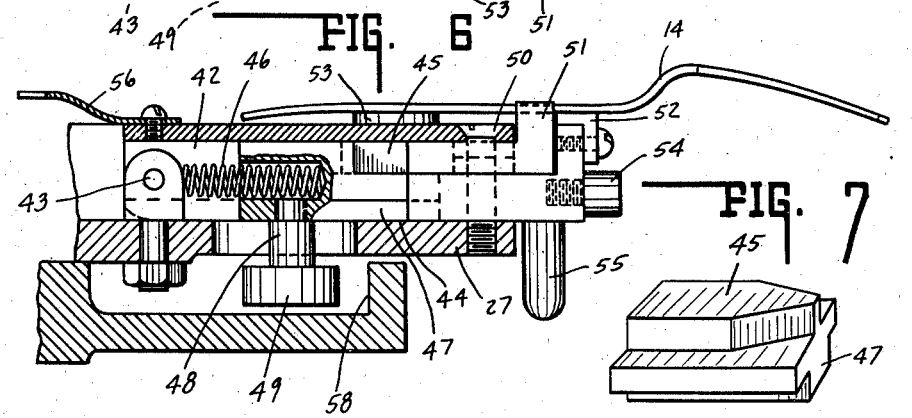
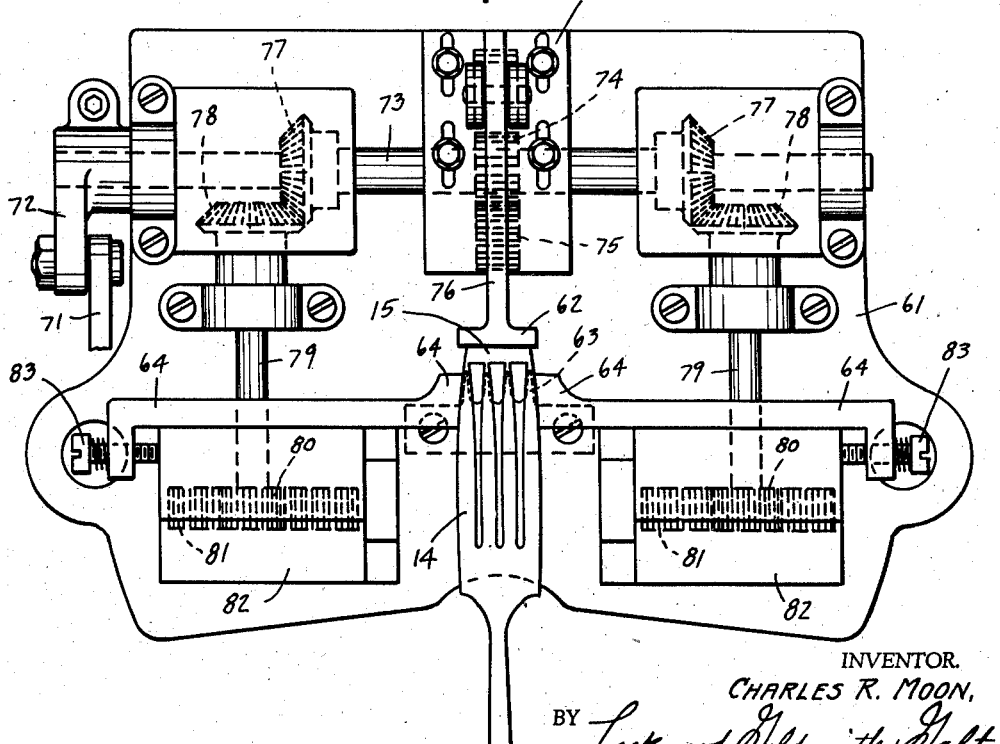
INVENTOR.
CHARLES R. MOON,
BY Lockwood, Goldsmith & Galt
ATTORNEYS.

Aug. 11, 1942.                 C. R. MOON                  2,292,960
                   AUTOMATIC FEEDING AND STACKING MACHINE
                   Filed Aug. 21, 1941        7 Sheets-Sheet 6
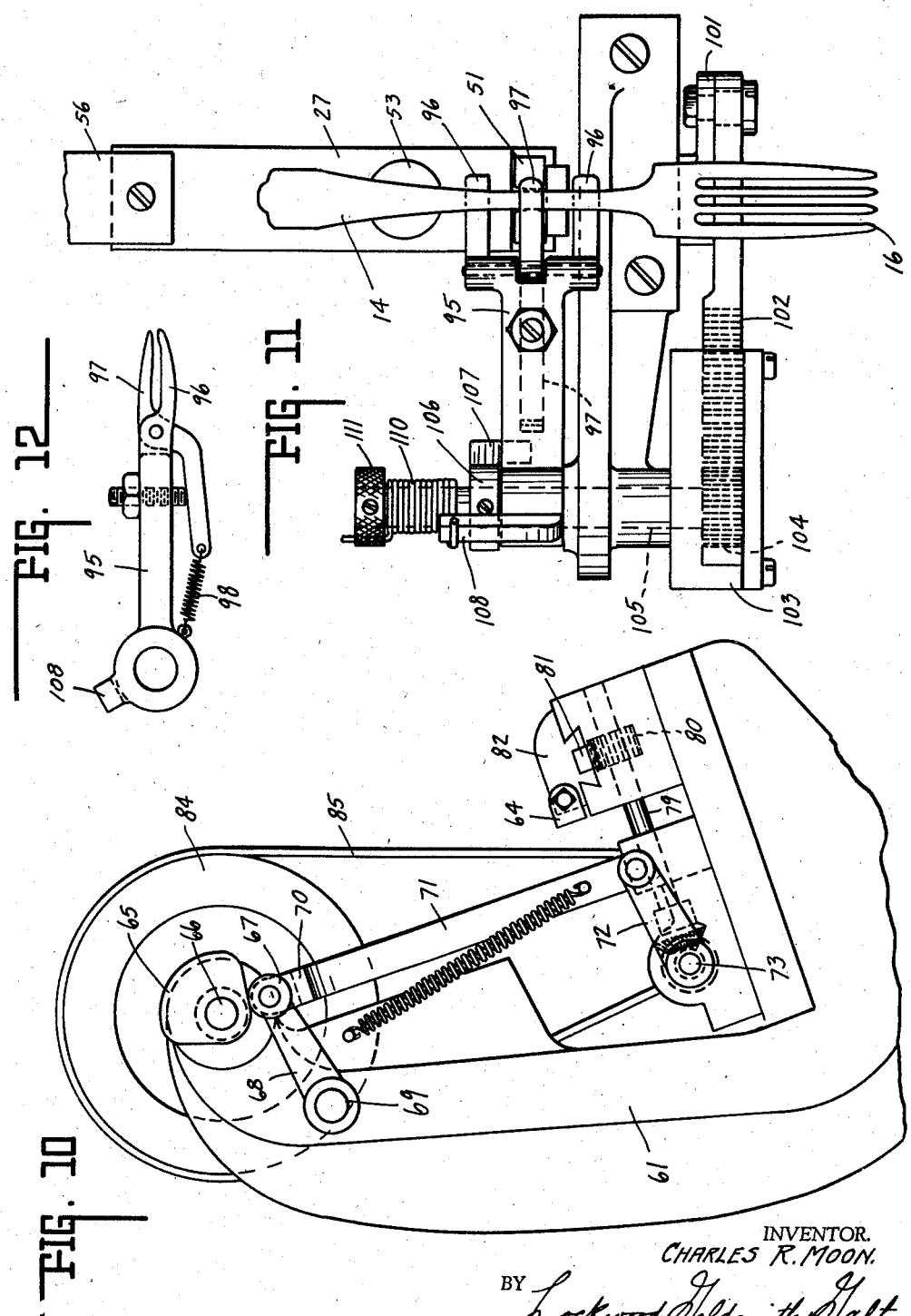
INVENTOR.
CHARLES R. MOON.
BY Lockwood, Goldsmith & Galt
ATTORNEYS.

Aug. 11, 1942.  C. R. MOON  2,292,960
AUTOMATIC FEEDING AND STACKING MACHINE
Filed Aug. 21, 1941  7 Sheets-Sheet 7
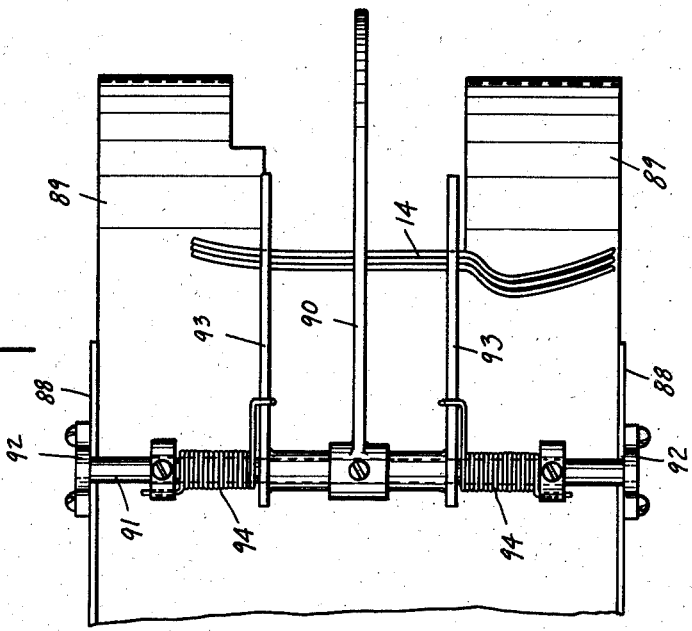
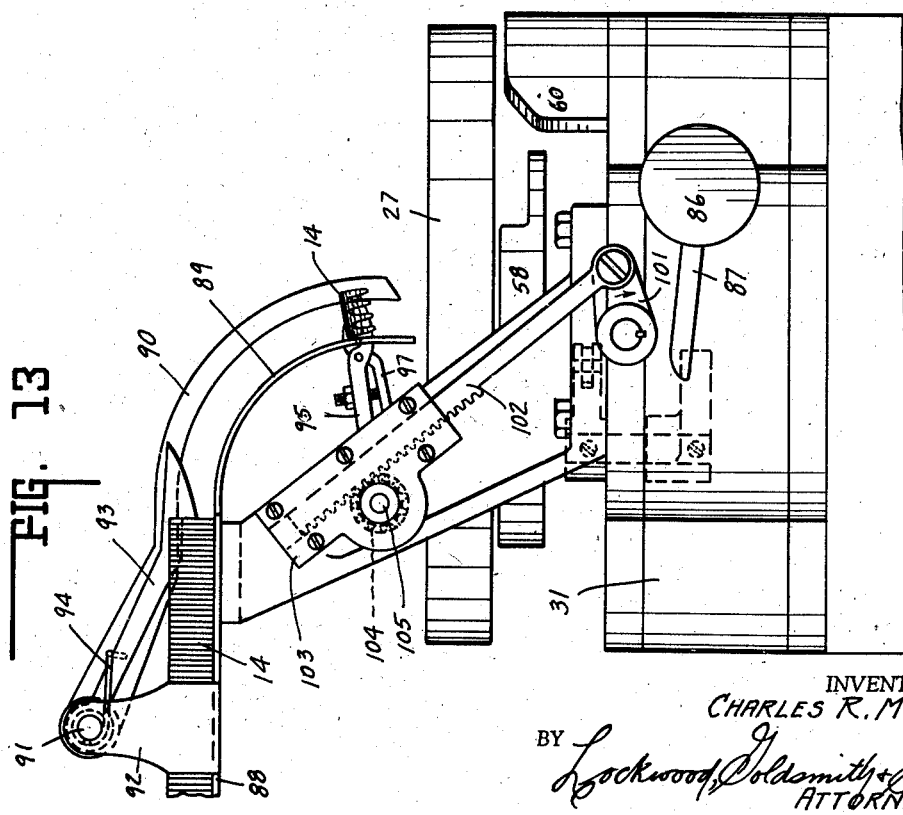
INVENTOR.
CHARLES R. MOON.
BY
Lockwood, Goldsmith & Galt
ATTORNEYS.

Patented Aug. 11, 1942

2,292,960

UNITED STATES PATENT OFFICE 2,292,960

AUTOMATIC FEEDING AND STACKING MACHINE

Charles R. Moon, Muncie, Ind., assignor to Ontario Manufacturing Company, Muncie, Ind., a corporation Application August 21, 1941, Serial No. 407,774

20 Claims. (Cl. 164—116)

This invention is directed to an automatic feeding machine operating to feed work from a stack to a press, hammer or the like, and after the operation, to automatically restack the work. More particularly, it is directed to such a machine adapted to handle articles of flatware, table cutlery or the like, wherein such articles are removed one at a time from the stack, aligned for accuracy of the operation, then removed and restacked following the operation, such machine being particularly useful in the clipping of tie bars from table fork tines.

The principal object of the invention is to provide such a machine, which is wholly automatic, with a feeding mechanism for feeding the articles from a stack, a turret for carrying the articles from the stack to a press, an aligning unit operating in timed relation with the turret and press to accurately align the article for the operation, and a stacking mechanism operable to remove the article from the turret after the operation and place it in an off bearing stack.

One feature of the invention resides in the arrangement for supporting the stack of articles and effecting removal and gripping of the lowermost article to the stack.

Another feature of the invention resides in the mechanism operating to raise and lower the elevation of the article relative to the turret and press for effecting its removal from the stack, carry it over the adjacent part of the press and lay it in operative position thereon, and again elevate it over the adjacent portion of the press as it is removed therefrom.

Another feature of the invention resides in the aligning unit acting in timed cooperation with the movement of the turret and press to accurately align the article upon the die block as it is presented for the operation, and including a member for engaging and pushing the article longitudinally into position while simultaneously engaging and aligning it laterally of the die.

Another feature of the invention resides in the mechanism operating in timed relation with the turret for removing the article from the gripping blocks and carrying it to placement in the stack of finished articles.

Other features of the invention will be hereinafter more specifically set forth and described in the following description and claims.

The full nature of the invention will be understood from the accompanying drawings and the following description and claims:

Fig. 3 is a vertical cross sectional view of the turret driving mechanism with parts shown in section and other parts shown in elevation.

Fig. 4 is a plan view of the turret with the superstructure removed, and a portion broken away.

Fig. 5 is a plan view of the turret gripping block with an article in gripped position.

Fig. 6 is a side elevational view of the gripping block shown in Fig. 5 with parts thereof in longitudinal section.

Fig. 7 is a perspective view of a portion of the actuating wedge of the gripping block.

Fig. 8 is a sectional view of the lower part of the feeding mechanism.

Fig. 9 is a plan view, with parts removed, of the aligning unit of the press.

Fig. 10 is a side elevational view showing the driving mechanism of the aligning unit with parts broken away and in section.

Fig. 11 is a plan view of the stacking mechanism with parts broken away and in section, and in association with the gripping block.

Fig. 12 is a side elevational view of the stacking mechanism lifting arm.

Fig. 13 is a side elevational view of the stacking mechanism in association with the turret and driving mechanism therefor with parts shown in section.

Fig. 14 is a plan view of the receiving end of the stacking mechanism.

Figure 1:
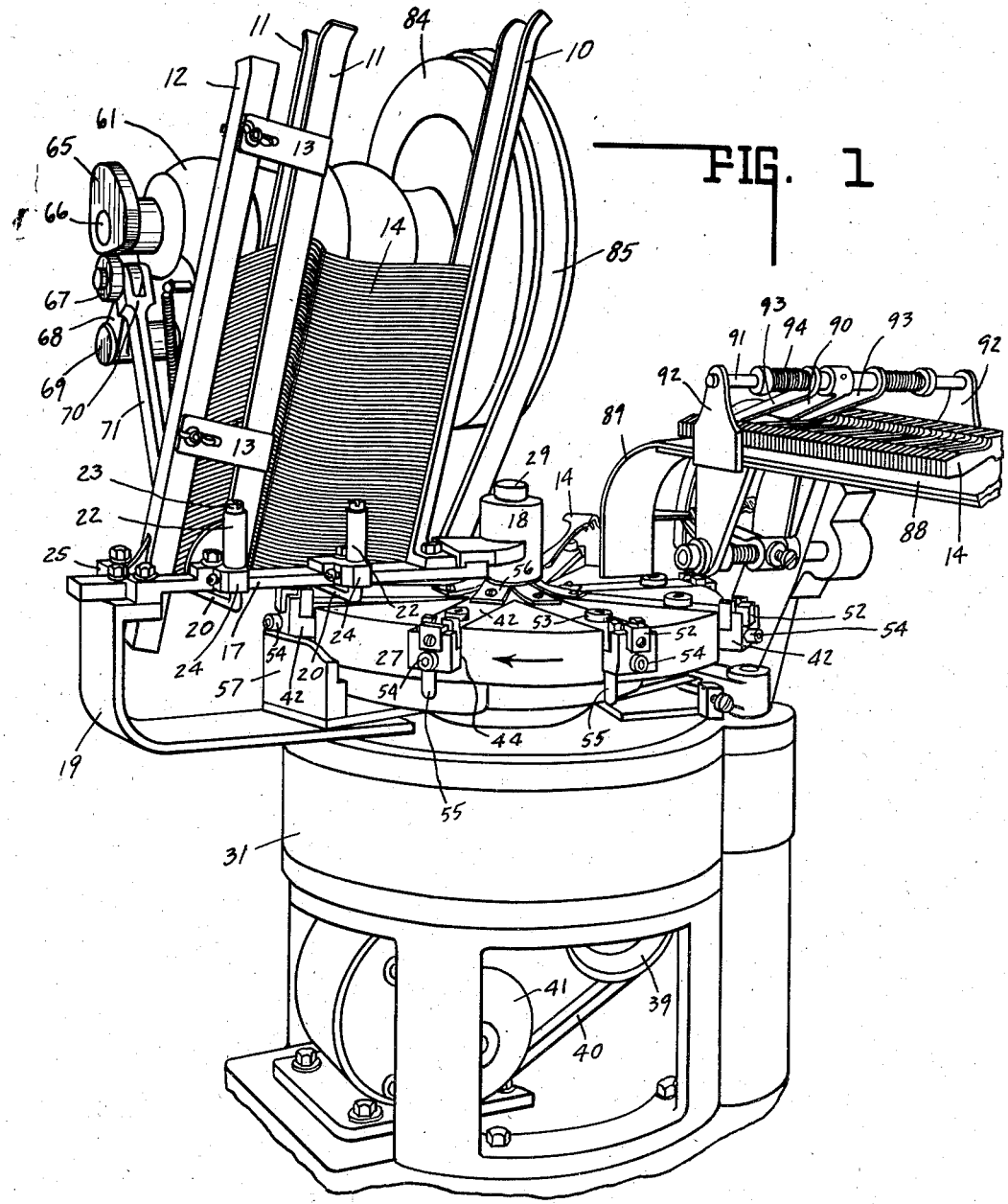
Fig. 1 is a perspective view of the machine, showing the inactive sector of the turret.

In the drawings there is illustrated an automatic feeding machine for a press, hammer or similar machine, to be used to present articles of flatware, table cutlery or the like to a stamping machine or hammer, or for other and similar operations.

The machine in its automatic operation and the cooperation of its various parts to accomplish the purpose, may, for convenience of description, be divided into four units. The first unit comprises a rack for supporting a stack of the articles with the mechanism for feeding the articles to a turret. This will be generally referred to as the "feeding mechanism." The second unit is the turret which receives the articles from the feeding mechanism, carries and presents them to the clipping or stamping die. This will be generally referred to as a "turret." The third unit comprises the mechanism associated with the turret and the die for positioning and aligning the article for the operation. This will be generally referred to as the "aligning unit." The fourth unit comprises a mechanism for removing the article from the turret after the operation and restacking it, hereinafter referred to as the "stacking mechanism."

The machine may be generally described as follows: The articles, which in this case comprise table forks, are stacked vertically to be fed by the feeding mechanism from the bottom of the stack onto a periodically rotating turret. The feeding mechanism includes means for separating the lower article from the stack and properly positioning it on the turret in timed relation with the periodic rotation thereof so as to be clamped in position thereon. The turret is then rotated to present the received and clamped article to the die, whereupon the aligning unit functions in timed relation with the turret to accurately position the article in respect to the die for the clipping or stamping operation. The machine as herein illustrated is designed to clip the ends of the fork to form the sharp pointed tines. Following the clipping operation the article is removed from the die and carried by the turret to the stacking mechanism. Thereupon the article is released from the turret, picked up and lifted into a horizontally supported stack which is fed from the machine.

Feeding mechanism

There is illustrated a rack comprising an upright trough 10, spaced bars 11 and trough 12, the latter two being adjustably secured in spaced relation by the straps 13. Stacked between the troughs and held in alignment by the bars 11 there is a plurality of articles, illustrated herein as table forks and indicated at 14. As shown in Fig. 4, the forks 14 are contained in the stack with the ends of their tines joined by the metal tie bar indicated at 15, resulting from the previous stamping operation, it being the purpose of this machine to remove the tie bar 15 so that the tines are separated and pointed, as indicated at 16.

The stack is supported generally by a horizontally extending bar 17 which extends radially over the turret, having its inner end secured to a bearing sleeve 18 and its outer end supported by a bracket 19 extending downwardly and under the rotating turret. At spaced intervals on said bar there are adjustable supports, (see Figs. 1, 8), each comprising a finger 20 extending under the bar and the stack of articles upon which they rest. Said finger extends inwardly under the stack from a post 21 which is slidably and adjustably mounted within a barrel 22. By means of a screw 23 the post and, therefore, the finger 20, may be adjusted in respect to its spaced relation to the bar 17. The post is secured on the bar by a block 24. The spaced relation between the finger 20 and the bar 17 is adjusted to only slightly exceed the thickness of the article.

In alignment with the bar 17 on the other side of the stack there is a companion bar 25 which adjustably carries thereon a guard member 26. This arrangement permits the slidable removal from the fingers 20 of the lowermost article, whereas the remaining articles in the stack are held in place by the guard 26. The lowermost article is slid laterally from underneath the stack and off of the fingers 14 by a take-off mechanism mounted on the turret and rotating therewith.

Turret

The turret 27 is secured for rotation by a spindle 28 having an upper extension 29 upon which the sleeve 18 is mounted. The spindle extends downwardly and is supported in the bearings 30 of the frame structure 31. Keyed to the spindle there is a Geneva gear 32 which is driven by a Geneva crank 33 (Figs. 3, 4) carrying a gear engaging roller 34. The crank is carried upon a spindle 35 supported by bearings 36 to which is keyed a worm gear 37 driven by the worm 38. The worm 38 is keyed to a pulley 39 driven by a belt 40 from the motor 41. By its constant rotation, the Geneva crank acts to intermittently and periodically rotate the Geneva gear and the turret. The turret is radially recessed at intervals to receive the take off and article carrying mechanism.

This mechanism (Figs. 4, 5 and 6) comprises a carrier block 42, hinged to the turret at 43 to extend radially thereof and lie in one of the radial recesses 44. Mounted within the block there is a clamping wedge 45. The wedge is milled out to receive a compression spring 46 bearing against the hinged end of the block. The wedge is formed with a sliding base 47 slidably mounted in the block 42 and receiving in its underside a pin 48 carrying a cam actuated roller 49.

Forwardly of the wedge and pivotally supported on the block at 50 there is a pair of clamping fingers 51 extending upwardly above the block for clamping engagement with one of the articles 14. The relation of the clamping fingers and the wedge is such that the wedge extends between the ends of the fingers on the other side of the pivotal point from their clamping end so that when the wedge moves forwardly under tension of spring 46, it spreads the rear end of the fingers and forces the clamping ends thereof together into clamping engagement. The forward end of the block carries a spacing member 52 and on the other side of the clamping fingers it carries a spacing button 53, both serving to support the article in spaced relation with the block to readily permit gripping engagement by the fingers. Also on the forward end of the block there is a cam actuated boss 54 and extending downwardly from the forward end thereof there is a cam actuated finger 55. At the rear end of the block a leaf spring 56 is secured thereto, which bears against the spindle 29 under the sleeve 18 tending to hold the block in its lower position in the slot 44 of the turret under spring tension.

The take-off devices, comprising the block 42 and associated mechanism, is normally held in its lower position by the spring 56, but is raised to engage and slidably remove the lowermost article 14 from under the stack and off of the fingers 20. For this purpose there is provided a cam 57 engageable by a boss 54 as the turret moves in the direction of the arrow shown in Fig. 1. The cam thus elevates the block 42 against the tension of the spring 56 to a position wherein the fingers 51 embrace the lowermost article 14 at the bottom of the stack. Continued rotation of the turret then has the effect of causing the article to be removed from the stack to a position on the take-off device between the clamping fingers 51. During this same action, the clamping fingers are spread apart so as to readily embrace the article by compression of the spring 46 upon rearward movement of the wedge 45 due to engagement of a cam 58 by the roller 49. However, as soon as the fingers 51 have embraced the article, the cam 58 is disengaged by roller 49 so that spring 46 effects the clamping action above described.

Figure 2:
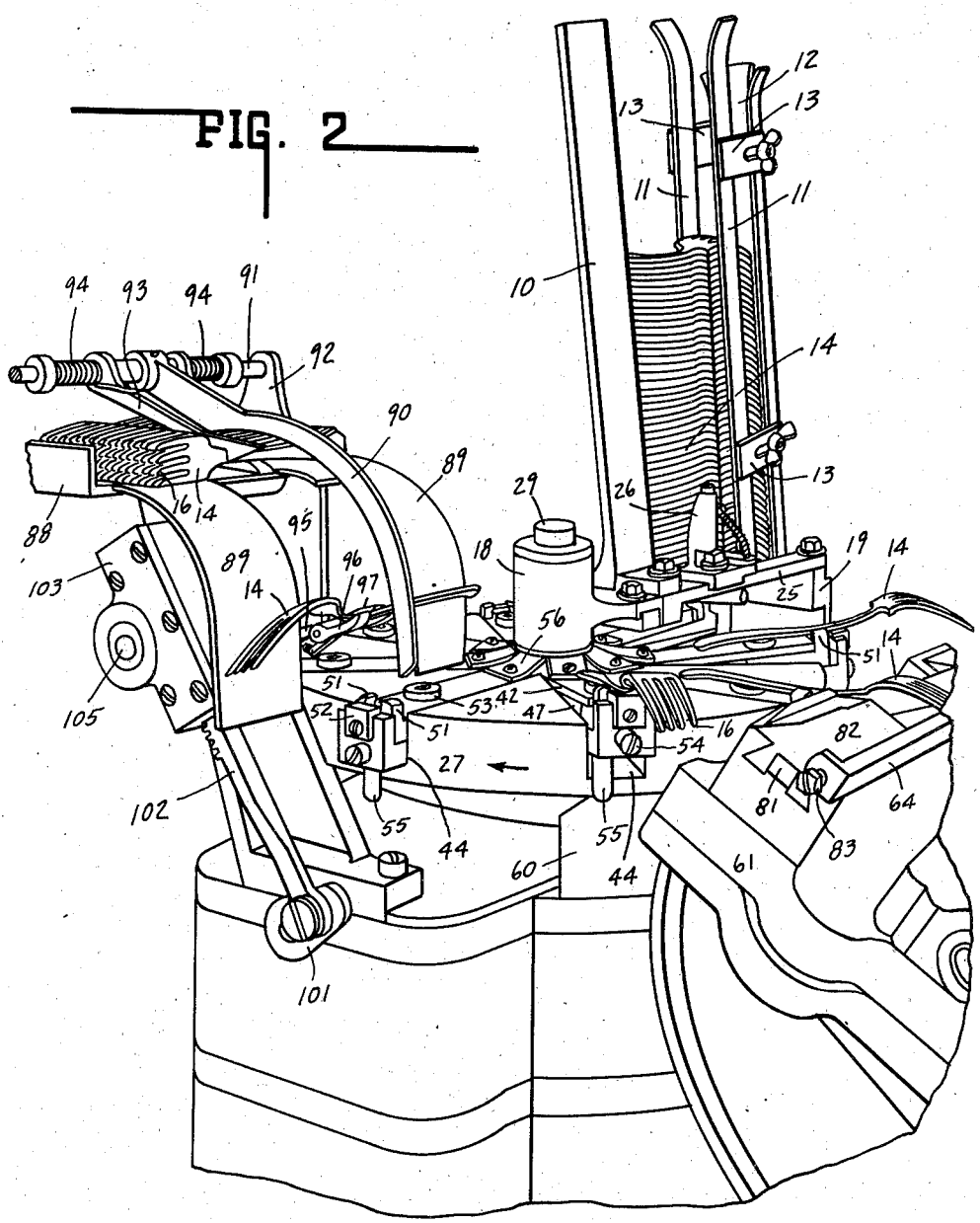
Fig. 2 is a perspective view of the turret and associated mechanism showing the active sector thereof.

The next step in the periodic rotation of the turret brings the article into position for the press operation, during which movement the article must be first elevated to clear the aligning mechanism of the press. For that purpose there is provided a cam 59 which extends about and below the turret at the feeding side of the press. This cam is engaged along its upper cam surface by the pin 55. During the next step in the rotation of the turret the pin 55 rides up on the cam 59 until the article is centered over the operating position of the press so as to be lowered thereon. The article is then aligned for the operation, as will be hereinafter described, whereupon the press acts to strike off the metal indicated at 15. Following such strike-off operation, the next step in the rotation of the turret causes pin 55 to ride up on the surface of cam 60 which is substantially a duplicate of cam 59 (Figs. 2 and 4). This causes the block 42 to elevate the article for clearing the following side of the press, after which the pin rides off of the cam and the block and article return to the level of the turret. The next step in the movement of the turret brings the article in position to be picked up and restacked by the stacking mechanism to be hereinafter described.

*Aligning unit*

Associated with the press, which is generally indicated at 61 (Fig. 2) and operating in timed relation with the turret and the press, there is an aligning unit. This unit (Fig. 9) embodies an aligning member 62 operable to engage the forward end of the article and accurately position it in respect to the die for an operation. Said member is associated with a supporting lower die block 63 fixedly mounted on the press 61. Thus, the member 62 aligns the article longitudinally in respect to the die block 63, whereas adjustable centering arms 64 effect the lateral alignment. The purpose for the action of the member 62 is because of the fact that as the articles are removed from the feeding mechanism and gripped on the turret, their longitudinal position may vary, but the mechanism is so set that such variation is always in favor of the article being in a forward position so that it may be pushed back to its aligned position by the member 62, which member acts as a pusher.

The aligning member 62 or pusher is reciprocated periodically in timed relation with the movement of the turret so as to move into engagement with each new article presented, and push it back to aligned position. This movement is imparted to the member by a cam 65 which is driven by shaft 66. The shaft 66 is the power shaft of the press and is electrically driven in synchronized timed relation with the turret through the closing of a circuit by a turret-actuated switch, as will be hereinafter described. Cam 65 operates upon a cam follower 67 supported upon the free end of lever 68 which is fulcrumed at 69 to the press. Lever 68 also has pivotally connected therewith at the position of the cam follower a yoke 70 connected with an arm 71 having its opposite or lower end pivoted to a crank 72 which is keyed to a shaft 73. Centrally of the shaft 73 there is secured a pinion 74 which meshes with a rack 75 on a stem 76 of the aligning member 62, said stem being slidably supported and guided in its movement by a bearing plate 177 adjustably mounted longitudinally of the press.

For imparting laterally directed aligning movement to the arms 64, the shaft 73 has keyed thereto on each side of the pinion 74 the beveled gears 77 meshing with their respective companion gears 78 which are keyed upon their respective shafts 79. Said shafts each extend into a bearing housing and carry at their opposite ends the pinions 80 which mesh with their respective racks 81. Secured upon each of the rocks 81 there is provided a slide 82 which mounts the arms 64, said arms being manually adjustable in respect to the slides 82 by the adjusting screws 83.

From the above description it will be observed that as the article is positioned for the operation and through the timing mechanism just prior to the stamping operation, the aligning member 62 engages the article to align it longitudinally with the die block and the arms 64 are brought together to engage opposite sides of the article to align it laterally of the die block.

For driving the power shaft 66 there is provided a pulley 84 driven by a belt 85 from a motor, not shown. The trip mechanism of the press is controlled by a switch 86. Said trip mechanism is solenoid actuated in the usual manner, and since the press and its trip mechanism forms no part of this invention and is of a well known type, it is not illustrated herein. The switch is mounted on the turret base 31 and is provided with a switch finger 87 extending in position to be periodically actuated by the turret and in timed relation therewith through the medium of the stacking mechanism to be hereinafter described. Thus, upon the turret rotating each step, the switch 86 is actuated to trip the press, whereupon rotation is imparted to shaft 66 for operating the aligning unit and press for the operation.

*Stacking mechanism*

The stacking mechanism includes a substantially horizontally extending trough 88 (Fig. 2) of such form and shape as to receive the articles, such as the forks, in horizontal stacked relation supported on edge laterally of the trough. Curved downwardly from the mouth of the trough there is a pair of arcuate guide plates 89 with which there is associated an arcuate finger 90 pivotally mounted on a rod 91 extending laterally of the trough and supported above the stack by the brackets 92. The finger is secured to the rod 91 and on each side of said finger there is a latch bar 93 which is pivotally mounted on said rod and spring pressed by the springs 94 to exert a downward pressure on their outer ends, respectively. Said outer ends are beveled and notched so that the article may be pressed past their ends, raising them by engagement of their beveled forward surface and then latched through the tension of the spring 94 upon passing beyond the notch. Thus, the articles are caused to slide upwardly between the arcuate guide plates 89 and the finger 90 until engaged and latched in the stack by the latching arms 93. (Figs. 13, 14.)

Upon the turret carrying the article to the stacking mechanism, the article is released by the gripping fingers 51, through retraction of the wedge 45 upon engagement of the roller 49 with the cam surface 58 mounted beneath the turret at that position. The article thus released is then gripped by a pick-up arm 95 (Figs. 11, 12). Said arm is provided on its free ends with a pair of spaced fingers 96 which are extended under the article on each side of the gripping fingers 51. Pivotally mounted on the arm and extending intermediate of the fingers 96 there is a movable finger 97 which extends over the top of the article for gripping it against the fingers 96. The finger 97 is fulcrumed on the arm 95 carrying a tail piece connected by a spring 98 to the remote end of said arm. The ends of the fingers 96 and 97 are beveled to permit the article to be wedged in between them against the tension of spring 98 which thereupon acts to grip it sufficiently to raise the article upon an upward swinging movement of the arm.

Having thus gripped the article, the arm is swung upwardly, guided by the arcuate plates 89 and finger 90 until it is latched by the latch fingers 93. The upward swinging movement of the arm is caused by the drive mechanism originating with the Geneva crank 33. As shown in Fig. 3, the shaft 35 rotating said crank terminates in a beveled gear 99 which drives a beveled gear 100, both having bearings in the base frame 31. Gear 100 causes rotation of a crank arm 101 (Figs. 11, 13) to which is pivotally connected a rack bar 102 slidably operating in a floating bearing box 103. Said rack meshes with and drives a pinion 104 keyed to a shaft 105. Keyed to the shaft 105 there is a collar 106 having a lug 107 engaging under the arm 95 which is freely mounted on the shaft so that rotation of the shaft in one direction causes the lug 107 to swing the arm upwardly. The arm is returned or held against the lug during its downward swinging movement by the lug 108 on the arm 95 which is engaged and spring actuated by a spring 110 surrounding and carried by the shaft 105 and anchored to a collar 111 fixed to the outer end of the shaft. The block 42, having thus been relieved of the article, is then carried by the turret in its lowered position until it is again raised upon arrival at the feeding station.

Operation

From the above description, it will be observed that all four units of the mechanism cooperate together in timed relation to automatically present each individual article to the press. As shown in Fig. 2, the functioning of the machine starts at the feeding station through the operation of the feeding mechanism to engage the lowermost article 14 in the stack carried by the rack and slide it outwardly therefrom by the gripping fingers 51. This is followed by the immediate gripping of the article by said fingers, whereupon it is carried in elevated position over the side of the press and lowered into position on the press for receiving the operation. Just prior to the action of the press the article is aligned over the die block 63 longitudinally by the member 62 and laterally by the arms 64. The punching or clipping operation by the press in the usual manner immediately follows. The press is actuated in timed relation with the turret through the periodic engagement of the crank arm 101 with the switch finger 87 (Fig. 13).

Following the press operation, the aligning member 62 and arms 64 are withdrawn to free the article which is again elevated to clear the press. Thereupon the article is moved by the turret into gripping relation with the fingers 96, 97 which swing it upwardly, guided by the plates 89 and finger 90 to a position where it is latched by the latching fingers 93 in its outgoing stacked position.

The invention claimed is:

1. Feeding mechanism for articles to be processed, comprising a rack in which the articles are maintained in stacked relation one upon the other, a pair of spaced fingers secured to the rack extending under the stack upon which it is supported, said rack and fingers being spaced substantially the thickness of an article to permit removal therebetween of the lowermost article while retaining the superposed articles in the stack, an article gripping member, and mechanism operable to move said member to engage and slide the lowermost article off of said fingers from the bottom of the stack.

2. Feeding mechanism for articles to be processed, comprising a rack in which the articles are maintained in stacked relation one upon the other, a pair of spaced fingers secured to the rack extending under the stack upon which it is supported, said rack and fingers being spaced substantially the thickness of an article to permit removal therebetween of the lowermost article while retaining the superposed articles in the stack, an article gripping member, and mechanism operable to move said member to engage and slide the lowermost article off of said fingers from the bottom of the stack, said mechanism also being operable to grip the removed article and carrying it from the stack to processing position.

3. Feeding mechanism for articles to be processed, comprising a vertical rack in which the articles are slidably maintained in stacked relation supported one upon the other, a horizontal supporting member for said stack and related to said rack to provide an opening the thickness of one article through which the lowermost article of the stack may be slid from the horizontal supporting member, an article carrying member, and mechanism operable to move said carrying member to engage and slide the lowermost article off of said supporting member from the bottom of the stack.

4. Feeding mechanism for articles to be processed, comprising a vertical rack in which the articles are slidably maintained in stacked relation supported one upon the other, a horizontal supporting member for said stack and related to said rack to provide an opening the thickness of one article through which the lowermost article of the stack may be slid from the horizontal supporting member, an article carrying member, and mechanism operable to move said carrying member to engage and slide the lowermost article off of said supporting member from the bottom of the stack, said mechanism also being operable to grip the removed article and carry it to processing position.

5. Feeding mechanism for articles to be processed, comprising a vertical rack in which the articles are slidably maintained in stacked relation supported one upon the other, a horizontal supporting member for said stack and related to said rack to provide an opening the thickness of one article through which the lowermost article of the block may be slid from the horizontal supporting member, a turret rotatable below said rack and stack with the center of rotation to one side thereof, means for periodically rotating said turret, a plurality of carrying members radially and movably mounted upon said turret, and mechanism actuated in timed relation with the movement of said turret operable to move one of said carrying members to engage and slide the lowermost article off said supporting member from the bottom of the stack upon being moved by said turret in alignment therewith.

6. Feeding mechanism for articles to be processed, comprising a vertical rack in which the articles are slidably maintained in stacked relation supported one upon the other, a horizontal supporting member for said stack and related to said rack to provide an opening the thickness of one article through which the lowermost article of the block may be slid from the horizontal supporting member, a turret rotatable below said rack and stack with the center of rotation to one side thereof, means for periodically rotating said turret, a plurality of carrying members radially and movably mounted upon said turret, and mechanism actuated in timed relation with the movement of said turret operable to move one of said carrying members to engage and slide the lowermost article off said supporting member from the bottom of the stack upon being moved by said turret in alignment therewith, said mechanism also being operable to cause the removed article to be gripped upon said carrying member for processing.

7. Feeding mechanism for articles to be processed, comprising a rotatable turret, means for periodically rotating said turret, a plurality of radially extending article carrying members movably mounted on said turret, a magazine from which said articles are individually supplied to each of said members when at one position and presented for processing when carried thereby to another position, and cam members effective upon rotation of said turret operable to lift said members at predetermined stations to effect clearance of processing structure and lower said members at a predetermined station into processing position.

8. Feeding mechanism for articles to be processed, comprising a rotatable turret, means for periodically rotating said turret, a plurality of radially extending article carrying members movably mounted on said turret, a magazine from which said articles are individually supplied to each of said members, a pair of gripping fingers on each of said members between which the article is received thereon, spring-actuated means operable to normally effect a gripping action by said fingers, and a cam associated with said turret engageable by said means to move it against the tension of said spring for receiving and releasing the article when the turret is moved to predetermined positions.

9. Feeding mechanism for articles to be processed, comprising a rotatable turret, means for periodically rotating said turret, a plurality of radially extending article carrying members pivotally mounted at their inner ends on said turret, a series of cams positioned adjacent the periphery of said turret mounted independently thereof to permit of relative movement therebetween, and means on the free end of said members so arranged as to engage said cams at predetermined positions of the turret adapted to elevate and lower said members relative to the surface of the turret.

10. Feeding mechanism for articles to be processed, comprising a rotatable turret, means for periodically rotating said turret, a plurality of radially extending article carrying members movably mounted on said turret, each of said members carrying article engaging and gripping fingers, a slidable wedge normally operable under spring pressure to maintain said fingers in gripping relation with said article, and a cam mounted to permit relative rotation of said turret in respect thereto engageable by said sliding wedge to retract it to inoperative position whereby said gripping fingers may open to release the article.

11. Feeding mechanism for articles to be processed, comprising a rotatable turret, a magazine for said articles adjacent one station of the turret followed by a processing station, a stacking device for said articles positioned adjacent said turret at a third station, a plurality of radially extending article carrying members movably mounted on said turret, means for periodically rotating said turret to move said members from one station to the next, a cam on said mechanism adjacent the magazine station engageable by said members for elevation to article receiving position relative to said turret and magazine for removing and receiving an article therefrom, and a cam on said mechanism positioned on each side of the processing station engageable by said carriers to elevate the article while entering and leaving the processing station permitting lowering thereof into processing position intermediate said cams.

12. Feeding mechanism for articles to be processed, comprising a rotatable turret, a magazine for said articles adjacent one station of the turret followed by a processing station, a stacking device for said articles positioned adjacent said turret at a third station, a plurality of radially extending article carrying members movably mounted on said turret, means for periodically rotating said turret to move said members from one station to the next, a cam on said mechanism adjacent the magazine station engageable by said members for elevation to article receiving position relative to said turret and magazine for removing and receiving an article therefrom, a cam on said mechanism positioned on each side of the processing station engageable by said carriers to elevate the article while entering and leaving the processing station and permitting lowering thereof into processing position intermediate said cams, a retractable article gripping mechanism on each of said carrying members acting to normally grip and secure an article thereon, and a cam on said mechanism adjacent said turret at the magazine and stacking stations engageable by said mechanism adapted to retract it to receive and release said articles.

13. Feeding mechanism for articles to be processed, comprising a rotatable turret, driving mechanism operable to periodically rotate said turret, a plurality of radially disposed article carrying members on said turret adapted to each receive an article and present it for processing, an aligning member movably mounted on said mechanism positioned to engage said article upon its being presented thereto to slide said article into accurate processing position, and an operating connection between said driving mechanism and aligning member.

14. Feeding mechanism for articles to be processed, comprising a rotatable turret, driving mechanism operable to periodically rotate said turret, means on said turret for carrying an article into processing position, a plurality of aligning members movably mounted on said mechanism in embracing relation to the article when positioned thereupon, and an operating connection between said driving mechanism and aligning members operable to move said members into engagement with said article for accurate alignment thereof during the processing operation.

15. Feeding mechanism for articles to be processed, comprising a rotatable turret, driving mechanism operable to periodically rotate said turret, means on said turret for carrying an article into processing position, a reciprocating aligning member mounted on said mechanism radially of said turret positioned to engage the end of the article when presented, a pair of aligning members mounted on said mechanism movable toward and away from said article when presented, and an operating connection between said driving mechanism and aligning members operable just prior to the processing operation to move toward and in engagement with said article for accurately aligning it longitudinally and laterally for said operation.

16. In a feeding and processing machine, a rotatable turret, means for periodically rotating said turret to position an article to be processed, a plurality of article carrying members on said turret, an off bearing structure for receiving said articles from said turret after the processing operation, an article carrying arm associated with said structure in position to receive an article from said carrying members, and mechanism driven in timed relation with said turret operable to move said arm to carry the article received thereby to placement in said structure.

17. In a feeding and processing machine, a rotatable turret, means for periodically rotating said turret to position an article to be processed, a plurality of article carrying members on said turret, an off bearing structure for receiving said articles from said turret after the processing operation, article guiding members therefor, an article carrying arm pivotally mounted in said structure with its free end normally extending toward the turret in position to receive an article from a carrying member moving thereby, and mechanism connected to and driven in timed relation with said turret to periodically swing said arm from its article receiving position to placement position on said off bearing structure.

18. In a feeding and processing machine, a rotatable turret, means for periodically rotating said turret to position an article to be processed, a plurality of article carrying members on said turret, an off bearing structure for receiving said articles from said turret after the processing operation, article guiding members therefor, an article carrying arm pivotally mounted on said structure with its free end normally extending toward the turret in position to receive an article from a carrying member moving thereby, mechanism connected to and driven in timed relation with said turret operable to periodically swing said arm from its article receiving position to placement position on said off bearing structure, and a spring actuated latch on said structure positioned to receive each article placed thereon by said arm for retaining it in its off bearing position.

19. In a feeding and processing machine, a rotatable turret, means for periodically rotating said turret to position an article to be processed, a plurality of article carrying members on said turret, a horizontally disposed off bearing structure spaced above said turret for receiving said articles therefrom after the processing operation, arcuate guide members extending downwardly from the receiving end of said structure to the discharging position of said turret, an article carrying arm pivotally mounted on said structure with its free end normally positioned to receive an article from said carrying members, spring pressed jaws on the free end of said arm into which a member is forced by relative movement between the carrying members and arm, mechanism connected to and driven in timed relation with said turret operable to swing said arm from normal position through the arc of said guiding members with the received article slidably moving along said guiding members, and a spring pressed latch at the receiving end of said structure engageable by said article and operated thereby to remove it from said arm and latch it in off bearing position on said structure.

20. In a feeding and processing machine, a rotatable turret, mechanism for periodically rotating said turret, a magazine for containing a plurality of articles to be processed fixedly mounted over the surface of said turret at one side thereof, an off bearing structure fixedly mounted over said turret on the other side thereof, a plurality of article carrying members movably supported upon said turret in spaced relation, cooperating fingers on each of said members arranged to embrace and clamp an article thereon, cam means associated with said turret engageable by said carrying members for raising them into article engagement under the magazine for sliding the lowermost article therefrom, a cam member associated with said turret engageable by said carrying members to control the article gripping action of said fingers for securing the article thereon after receiving it and releasing the article after its processing operation, cam means associated with said turret engageable by said carrying members for raising them during passage into and out of processing position and permitting the lowering thereof during the processing thereof, the action of each of said cam members being effected through relative movement of the turret in respect thereto, slidably mounted aligning members on said machine operable to engage and accurately align the article when presented thereto for the processing operation, means connected with the driving mechanism for said turret operable to actuate said members in timed relation therewith, an off bearing arm mounted on said off bearing structure positioned to receive an article from one of said carrying members upon movement of the turret relative thereto and release the article from said fingers, and a driving connection between said arm and the driving mechanism of the turret for moving said arm in timed relation thereto, said arm being arranged to carry the article received thereby to the off bearing structure.

CHARLES R. MOON.